(12) United States Patent
Xiang et al.

(10) Patent No.: US 12,515,408 B2
(45) Date of Patent: Jan. 6, 2026

(54) COLOR 3D PRINTING METHOD, PRINTING APPARATUS AND TERMINAL DEVICE

(71) Applicant: ZHUHAI SAILNER 3D TECHNOLOGY CO., LTD., Zhuhai (CN)

(72) Inventors: Dongqing Xiang, Zhuhai (CN); Linting Xie, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 997 days.

(21) Appl. No.: 17/246,285

(22) Filed: Apr. 30, 2021

(65) Prior Publication Data

US 2021/0252790 A1    Aug. 19, 2021

Related U.S. Application Data

(63) Continuation of application No. PCT/CN2019/094481, filed on Jul. 3, 2019.

(30) Foreign Application Priority Data

Nov. 2, 2018    (CN) .......................... 201811302632.8

(51) Int. Cl.
*B29C 64/393* (2017.01)
*B29C 67/00* (2017.01)
(Continued)

(52) U.S. Cl.
CPC ........ *B29C 64/393* (2017.08); *B29C 67/0007* (2013.01); *G06T 19/20* (2013.01);
(Continued)

(58) Field of Classification Search
CPC ... B29C 64/393; B29C 67/0007; B29C 64/10; B29C 64/20; B29C 64/147; G06T 19/20;
(Continued)

(56) References Cited

U.S. PATENT DOCUMENTS 9,870,647 B2    1/2018  Park
2016/0015198 A1  1/2016  Choi et al.
(Continued)

FOREIGN PATENT DOCUMENTS

CN    103679815 A    3/2014
CN    105528494 A    4/2016
(Continued)

OTHER PUBLICATIONS

International Search Report for PCT/CN2019/094481.
(Continued)

*Primary Examiner* — Ryan F Pitaro
*Assistant Examiner* — Pursottam Giri
(74) *Attorney, Agent, or Firm* — J.C. PATENTS

(57) ABSTRACT

A color 3D printing method, a printing apparatus and a terminal device. The printing method includes acquiring an original three-dimensional model of an object to be printed; performing shell processing to the original three-dimensional model to generate an inner model and an outer model of the original three-dimensional model; performing slicing processing to the inner model and the outer model to generate multiple printing data corresponding one-to-one with each printing layer, the printing data including structural data representing the inner model in a printing layer, color data representing the outer model in the printing layer, and structural data representing the outer model in the printing layer; printing the object to be printed according to the printing data. The present method can distinguish between a background color and a surface color of the original three-dimensional model in a slice image, avoiding phenomena of not printing or misprinting.

16 Claims, 7 Drawing Sheets

(51) Int. Cl.
  *B33Y 10/00* (2015.01)
  *B33Y 50/02* (2015.01)
  *G06T 19/20* (2011.01)

(52) U.S. Cl.
  CPC .............. *B33Y 10/00* (2014.12); *B33Y 50/02* (2014.12); *G06T 2207/10024* (2013.01); *G06T 2219/2012* (2013.01)

(58) Field of Classification Search
  CPC .. G06T 2207/10024; G06T 2219/2012; B33Y 10/00; B33Y 50/02; B33Y 30/00; H04N 1/60
  See application file for complete search history.

(56) References Cited

U.S. PATENT DOCUMENTS

| | | | | |
|---|---|---|---|---|
| 2016/0019319 | A1* | 1/2016 | Shtilerman | B29C 64/386 264/308 |
| 2017/0225397 | A1* | 8/2017 | Ho | G06T 19/20 |
| 2017/0269475 | A1* | 9/2017 | Kuo | H04N 1/60 |
| 2018/0043680 | A1 | 2/2018 | Ochi | |
| 2018/0339446 | A1* | 11/2018 | Chen | B29C 64/124 |
| 2019/0011902 | A1* | 1/2019 | Su | G06T 19/20 |
| 2021/0362427 | A1* | 11/2021 | Gonzalez Martin | G06T 17/20 |

FOREIGN PATENT DOCUMENTS

| | | |
|---|---|---|
| CN | 107727189 A | 2/2018 |
| CN | 108230451 A | 6/2018 |
| CN | 108407290 A | 8/2018 |
| CN | 108437449 A | 8/2018 |
| CN | 109334011 A | 2/2019 |
| EP | 3438940 A1 | 5/2017 |
| EP | 3220623 A1 | 9/2017 |
| EP | 3346688 A1 | 7/2018 |
| JP | 2017170874 A | 9/2017 |
| JP | 2018094784 A | 6/2018 |
| WO | WO2016186236 A1 | 11/2016 |
| WO | WO2018107652 A1 | 6/2018 |

OTHER PUBLICATIONS

The first Office Action of the priority CN application 201811302632.8.
Notice of Allowance of the parallel JP application 2021-523438.
European Search Report of the parallel EP application 19878884.6.

* cited by examiner

COLOR 3D PRINTING METHOD, PRINTING APPARATUS AND TERMINAL DEVICE

CROSS-REFERENCE TO RELATED APPLICATION

The present application is a continuation of International Application No. PCT/CN2019/094481, filed on Jul. 3, 2019, which claims priority to the Chinese Patent Application No. CN201811302632.8 titled "Color 3D Printing Method, Printing Apparatus and Terminal Device" filed on Nov. 2, 2018, both of which are hereby incorporated by reference in their entireties.

TECHNICAL FIELD

The present application relates to the technical field of image forming apparatus, and in particular, to a color 3D printing method, a printing apparatus and a terminal device.

BACKGROUND 3D (Three Dimensional, 3D) printing is a technology to manufacture a 3D object by performing slicing based on a three-dimensional model and then processing and stacking layer by layer, which can be used in rapid prototyping manufacturing or additive manufacturing.

In prior art, 3D printing technologies for manufacturing 3D objects include fused deposition modeling technology (FDM), stereo lithography technology (SLA), selected laser sintering technology (SLS), laminated object manufacturing technology (LOM) or inkjet printing technology, etc. When a 3D model to be printed is with full color, it is necessary to identify color information of the 3D model, and print an object with corresponding colors according to the color information of the model.

However, during printing, when a slice layer has a same color as the background of the slice layer, a printing system cannot distinguish between the background information that does not need to be printed and the slice layer that needs to be printed according to the color information, which leads to chaos easily, resulting in circumstances of not printing or misprinting.

SUMMARY

To solve at least one problem mentioned in the background, the present application provides a color 3D printing method, a printing apparatus and a terminal device, which can distinguish between a background color and a surface color of an original three-dimensional model in a slice image, avoiding phenomena of not printing or misprinting.

To achieve the purpose mentioned above, in a first aspect, the present application provides a color 3D printing method, including:

acquiring an original three-dimensional model of an object to be printed;
performing shell processing to the original three-dimensional model to generate an inner model and an outer model of the original three-dimensional model;
performing slicing processing to the inner model and the outer model to generate multiple printing data corresponding one-to-one with each printing layer, the printing data including structural data representing the inner model in a printing layer, color data representing the outer model in the printing layer, and structural data representing the outer model in the printing layer; and
printing the object to be printed according to the printing data.

Optionally, the structural data representing the inner model in the printing layer is represented in a form of first image information, the color data representing the outer model in the printing layer is represented in a form of second image information and the structural data representing the outer model in the printing layer is represented in a form of third image information.

Optionally, the performing slicing processing to the inner model and the outer model to generate multiple printing data corresponding one-to-one with each printing layer specifically includes:

performing slicing processing to the inner model to generate the first image information; and
performing slicing processing to the outer model to generate the second image information and the third image information.

Optionally, the printing the object to be printed according to the printing data specifically includes:

determining a structure of the inner model in the printing layer according to the first image information, and determining a structure of the outer model in the printing layer by using the third image information; and
printing structures in the printing layer by using a printing material.

Optionally, the printing structures in the printing layer by using a printing material specifically includes:

printing the structure of the inner model in the printing layer by using a printing material having a preset color;
determining an actual color of the outer model in the printing layer by using the second image information, and printing the structure of the outer model in the printing layer by using a printing material having the actual color.

Optionally, both of the first image information and the third image information are binary image information.

Optionally, the second image information is 8-bit image information, 16-bit image information, 24-bit image information or 32-bit image information.

Optionally, before performing slicing processing to the inner model and the outer model to generate multiple printing data corresponding one-to-one with each printing layer, further include:

acquiring an empty region under a suspended part in the original three-dimensional model, and establishing in the empty region under the suspended part a supporting structure configured to fill the empty region under the suspended part;
the performing slicing processing to the inner model and the outer model to generate multiple printing data corresponding one-to-one with each printing layer specifically further includes:
performing slicing processing to the supporting structure to generating fourth image information;
Optionally, the printing the object to be printed according to the printing data specifically includes:
determining a structure of the inner model in the printing layer according to the first image information, determining a structure of the outer model in the printing layer according to the third image information, and determining a structure of the supporting structure in the printing layer according to the fourth image information;
printing structures in the printing layer by using a printing material.

Optionally, before printing the object to be printed according to the printing data, further include:
performing integration processing to the first image information, the third image information and the fourth image information to generate fifth image information.

The printing the object to be printed according to the printing data specifically includes:
determining a structure in the printing layer according to the second image information and the fifth image information, and determining an actual color of the outer model in the printing layer according to the second image information;
printing the structure in the printing layer by using a printing material, the printing material including a printing material having the actual color of the outer model in the printing layer.

Optionally, the printing data includes multiple data units, a data unit includes structural data representing the inner model in the printing layer, color data representing the outer model in the printing layer and structural data representing the outer model in the printing layer.

Optionally, the structural data representing the inner model in the printing layer, the color data representing the outer model in the printing layer and the structural data representing the outer model in the printing layer are data from different storage areas, respectively.

Optionally, the structural data representing the inner model in the printing layer, and the color data representing the outer model in the printing layer and the structural data representing the outer model in the printing layer are stored in a first storage area, a second storage area and a third storage area, respectively, and the first storage area, the second storage area and the third storage area are arranged in a specified order; or,
the structural data representing the inner model in the printing layer, and the color data representing the outer model in the printing layer and the structural data representing the outer model in the printing layer are stored in a first storage area, a second storage area and a third storage area, respectively, and the first storage area, the second storage area and the third storage area are independent of each other.

Optionally, the structural data representing the inner model in the printing layer, and the color data representing the outer model in the printing layer and the structural data representing the outer model in the printing layer are stored in a same storage area in an order of relative position in a coordinate system.

Optionally, printing the object to be printed according to the printing data specifically includes:
acquiring printing data in the first storage area, the second storage area and the third storage area according to a preset storage order, and printing the object to be printed according to the acquired printing data from different storage areas.

Optionally, printing the object to be printed according to the printing data specifically includes:
acquiring printing data in each data unit respectively according a preset storage order in the same storage area, and printing the object to be printed according to the printing data in different data units.

Optionally, performing slicing processing to the inner model and the outer model to generate multiple printing data corresponding one-to-one with each printing layer specifically includes:
performing slicing processing to the inner model to generate structural data of the inner model; and
performing slicing processing to the outer model to generate structural data and color data of the outer model.

Optionally, printing the object to be printed according to the printing data specifically includes:
printing a structure of the inner model in the printing layer by using a printing material having a preset color and according to the structural data of the inner model;
determining an actual color of the outer model in the printing layer by using the color data of the outer model, and printing a structure of the outer model in the printing layer by using a printing material having the actual color and according to the structural data of the outer model.

Optionally, before performing slicing processing to the inner model and the outer model to generate multiple printing data corresponding one-to-one with each printing layer, further include:
acquiring an empty region under a suspended part in the original three-dimensional model, and establishing in the empty region under the suspended part a supporting structure configured to fill the empty region under the suspended part;
the performing slicing processing to the inner model and the outer model to generate multiple printing data corresponding one-to-one with each printing layer specifically further includes:
performing slicing processing to the supporting structure to generate structural data of the supporting structure in the printing layer, where the structural data of the supporting structure is stored in a fourth storage area in an order of relative position in a coordinate system, or the structural data of the supporting structure and the structural data of the inner model and the color data and the structural data of the outer model are stored together in a same storage area in the order of relative position in the coordinate system.

In a second aspect, the present application provides a color 3D printing apparatus, including:
an acquiring module, configured to acquire an original three dimensional model of an object to be printed;
a first processing module, configured to perform shell processing to the original three-dimensional model to generate an inner model and an outer model of the original three-dimensional model;
a second processing module, configured to perform slicing processing to the inner model and the outer model to generate multiple printing data corresponding one-to-one with each printing layer, the print data including structural data representing the inner model at a printing layer, color data representing the outer model at the printing layer, and structural data representing the outer model at the printing layer;
a printing module, configured to print the object to be printed according to the printing data.

Optionally, the color 3D printing apparatus further includes a third processing module, configured to acquire an empty region under a suspended part in the original three-dimensional model, and establish in the empty region under the suspended part a supporting structure configured to fill the empty region under the suspended part;
the second processing module is further configured to perform slicing processing to the supporting structure to generate fourth image information or structural data of the supporting structure.

Optionally, the color 3D printing apparatus further includes a data integration module, configured to perform integration processing to the first image information, the third image information and the fourth image information to generate fifth image information.

In a third aspect, the present application provides a terminal device, including: a memory, a processor and a computer program stored in the memory and runnable on the processor, and the above-mentioned color 3D printing method is implemented when the processor runs the computer program.

In a fourth aspect, the present application provides a computer-readable storage medium, the computer-readable storage medium has a computer program stored thereon, and the above-mentioned color 3D printing method is implemented when a processor executes the computer program.

The color 3D printing method, the printing apparatus and the terminal device provided by the present application generate printing data including the structural data of the inner model and the structural data of the outer model and color data of the outer model, respectively, by performing shell processing and slice processing to the original three-dimensional model of the acquired object to be printed, and print by using the above-mentioned printing data, and thus, can distinguish between a background color and a surface color of the original three dimensional model in a slice image when the color of the object to be printed and the background color are the same, avoiding phenomena of not printing or misprinting.

The construction of the present application and other inventive purpose and beneficial effect thereof will be more apparent and easier to understand through the description of preferred embodiments with reference to accompanying drawings.

BRIEF DESCRIPTION OF THE DRAWINGS

To illustrate the technical solutions in the embodiments of the present application or in the prior art more clearly, the following will briefly introduce the drawings to be used in the description of the embodiments or the prior art. Apparently, the drawings described below are some embodiments of the present application, and for those of ordinary skill in the art, other drawings can be acquired according to these drawings without creative efforts.

Figure 1:
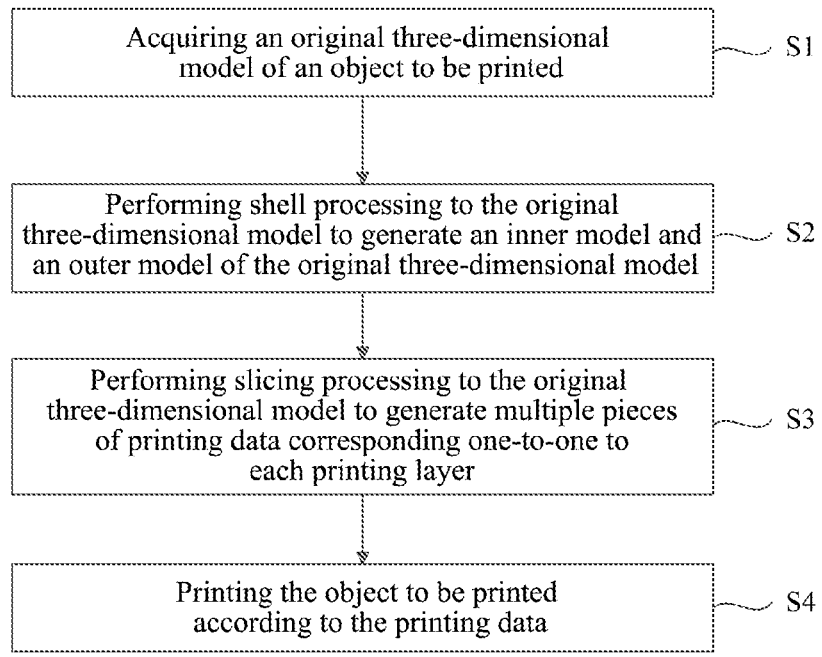
FIG. 1 is a schematic flow chart of a color 3D printing method provided by embodiment 1 of the present application.

DESCRIPTION OF NUMERALS IN THE DRAWINGS 1 original three-dimensional model;
11 inner model;
12 outer model;
13 background area;
2 supporting structure;
3 slice plane;
20 color 3D printing apparatus;
21 acquiring module;
22 first processing module;
23 second processing module;
24 third processing module;
25 data integration module;
26 printing module;
30 terminal device;
31 memory;
32 processor.

DESCRIPTION OF EMBODIMENTS

To make the purpose, the technical solution and the advantage of the present application clearer, the following will describe the technical solution of the embodiments of the present application in more detail with reference to the drawings in the preferred embodiments of the present application. In the drawings, the constantly same or similar numerals denote the same or similar parts or parts having the same or similar functions. The described embodiments are part of the embodiments of the present application, rather than all embodiments. The embodiments described below with reference to the drawings are illustrative, aiming to explain the present application, but cannot be considered as limitations to the present application. Based on the embodiments of the present application, all the other embodiments acquired by those of ordinary skill in the art without creative efforts fall within the protection scope of the present application. The following will describe the embodiments of the present application in detail with reference to the accompanying drawings.

In the description of the present application, it should be noted that, unless otherwise clearly specified and limited, terms "installation", "connect with", "connect to" should be understood in a broad sense, which, for example, may be fixed connection, may also be indirect connection through an intermediary therebetween, or may be inner connection between two elements or interaction relationship between two elements. For those of ordinary skill in the art, the specific meaning of the terms in the present application can be understood according to specific circumstances.

Embodiment 1

Figure 2:
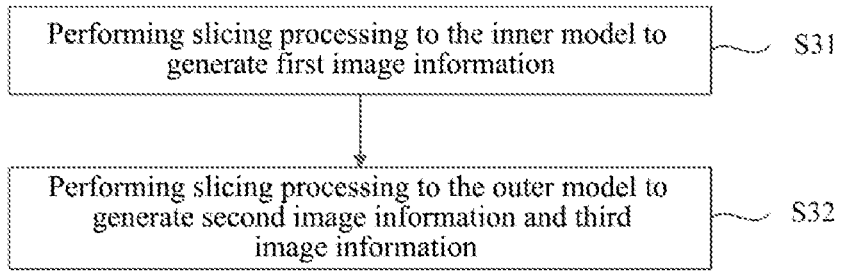
FIG. 2 is a schematic flow chart of a slicing processing step of the color 3D printing method provided by the embodiment 1 of the present application.
Figure 3:
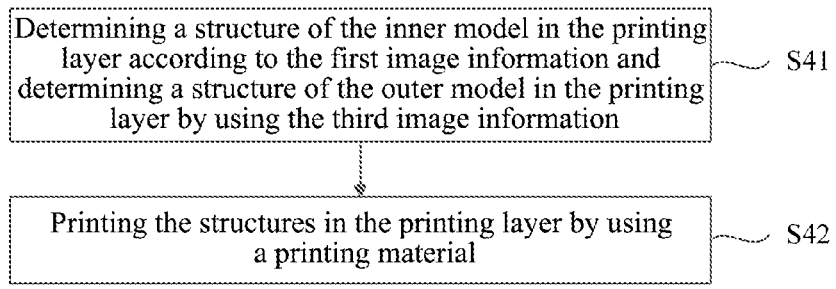
FIG. 3 is a schematic flow chart of a printing step of the color 3D printing method provided by the embodiment 1 of the present application.
Figure 4:
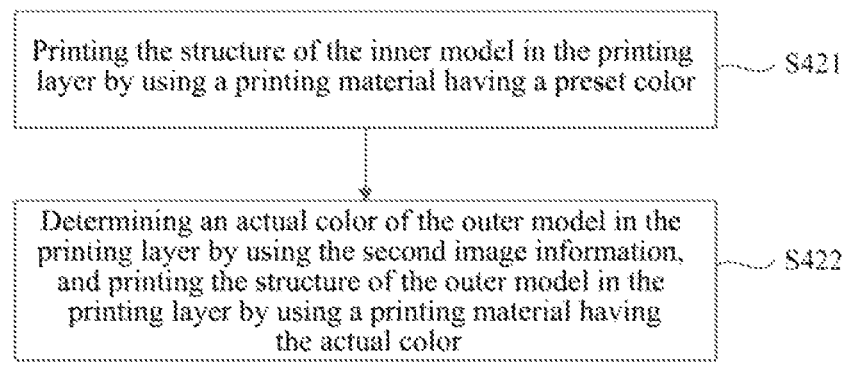
FIG. 4 is a schematic flow chart of a part of color printing of an inner model and an outer model in the printing step of the color 3D printing method provided by the embodiment 1 of the present application.
Figure 5:
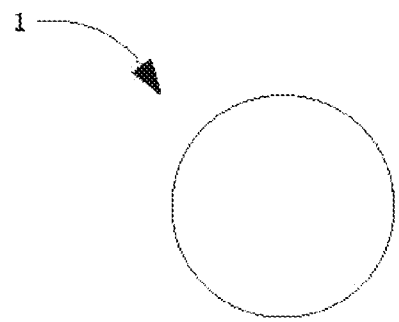
FIG. 5 is a schematic structural diagram of an original three-dimensional model of the color 3D printing method provided by the embodiment 1 of the present application.
Figure 6:
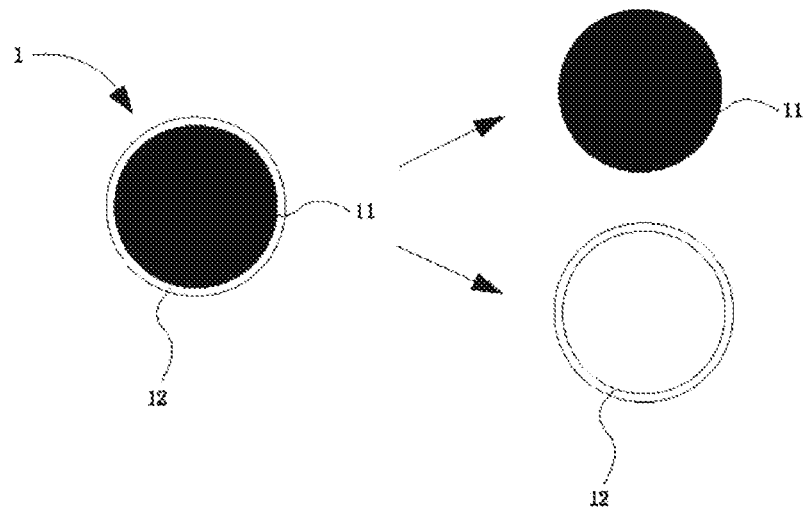
FIG. 6 is a schematic structural diagram of performing shell processing to the original three-dimensional model to generate an outer model and an inner model of the color 3D printing method provided by the embodiment 1 of the present application.
Figure 7:
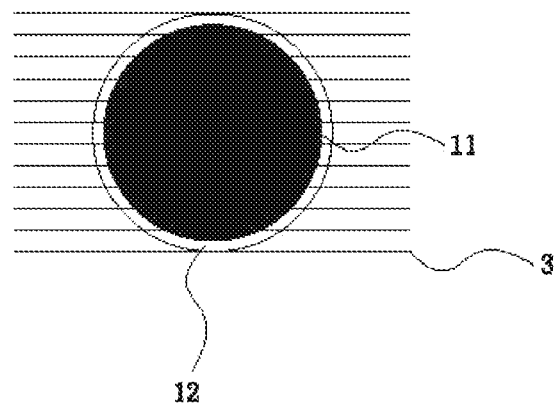
FIG. 7 is a schematic structural diagram of the slicing processing to the outer model and the inner model of the color 3D printing method provided by the embodiment 1 of the present application.
Figure 8:
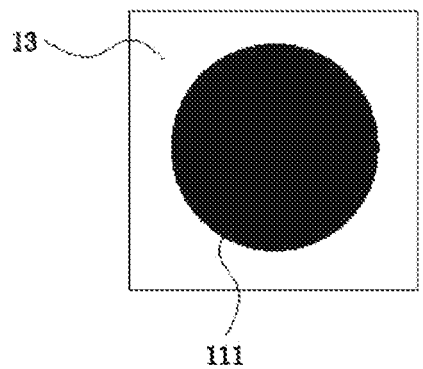
FIG. 8 is a schematic structural diagram of a first image including first image information of the color 3D printing method provided by the embodiment 1 of the present application.
Figure 9:
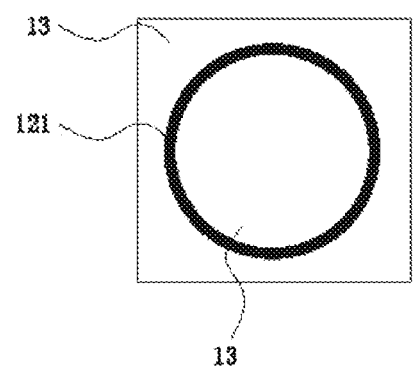
FIG. 9 is a schematic structural diagram of a third image including third image information of the color 3D printing method provided by the embodiment 1 of the present application.
Figure 10:
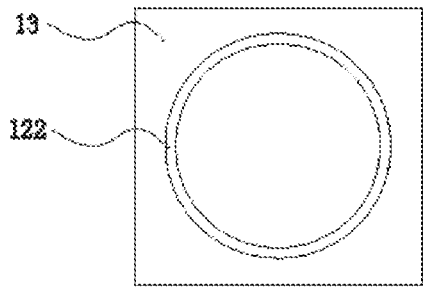
FIG. 10 is a schematic structural diagram of a second image including second image information of the color 3D printing method provided by the embodiment 1 of the present application.

FIG. 1 is a schematic flow chart of a color 3D printing method provided by the embodiment 1 of the present application. FIG. 2 is a schematic flow chart of a slicing processing step of the color 3D printing method provided by the embodiment 1 of the present application. FIG. 3 is a schematic flow chart of a printing step of the color 3D printing method provided by the embodiment 1 of the present application. FIG. 4 is a schematic flow chart of a part for color printing of an inner model and an outer model in the printing step of the color 3D printing method provided by the embodiment 1 of the present application. FIG. 5 is a schematic structural diagram of an original three-dimensional model of the color 3D printing method provided by the embodiment 1 of the present application. FIG. 6 is a schematic structural diagram of performing shell processing to the original three-dimensional model to generate an outer model and an inner model of the color 3D printing method provided by the embodiment 1 of the present application. FIG. 7 is a schematic structural diagram of slicing processing to the outer model and the inner model of the color 3D printing method provided by the embodiment 1 of the present application. FIG. 8 is a schematic structural diagram of a first image including first image information of the color 3D printing method provided by the embodiment 1 of the present application. FIG. 9 is a schematic structural diagram of a third image including third image information of the color 3D printing method provided by the embodiment 1 of the present application. FIG. 10 is a schematic structural diagram of a second image including second image information of the color 3D printing method provided by the embodiment 1 of the present application.

Referring to FIG. 1 to FIG. 10, the embodiment of the present application provide a color 3D printing method, and the color 3D printing method includes the following steps:

S1: acquiring an original three-dimensional model of an object to be printed.

It should be noted that, the method of acquiring an original three-dimensional model of an object to be printed in the embodiment can be scanning the object to be printed by using a scanning apparatus, as shown in FIG. 5, the original three-dimensional model 1 shown in the figure is acquired by scanning. After acquiring the original three-dimensional model 1, information of the original three-dimensional model 1 is transformed into a data format which can be recognized by layer-slicing software of a processing terminal, for example, to a stereolithography (STL) format, a polygon file (Polygon File Format, PLY) format, a virtual reality modeling language (VWRL) format, etc., and then information of the target object in a data format which can be recognized by the layer-slicing software is obtained.

S2: performing shell processing to the original three-dimensional model to generate an inner model and an outer model of the original three-dimensional model. Referring to FIG. 6, shell processing is performed in the acquired original three-dimensional model 1, where a wall thickness of the shell processing needs to ensure that both of the inner model 11 and the outer model 12 formed after the shell processing have good mechanical strength, and the wall thickness further needs to ensure a good color-expressing capability of the outer model 12. A specific wall thickness can be set as required, which will not be limited by the present embodiment.

S3: performing slicing processing to the inner model and the outer model to generate multiple printing data corresponding one-to-one with each printing layer. The printing data includes structural data representing the inner model in a printing layer, color data representing the outer model in the printing layer and structural data representing the outer model in the printing layer. The format based on the original three-dimensional model 1 is transformed into a data format provided for the layer-slicing software of the processing terminal to recognize, as shown in FIG. 7, slicing processing is performed to the inner model 11 and the outer model 12, respectively, by using the layer-slicing software, and bitmap images can be generated, and then each of the bitmap images is analyzed to obtain slice layer data of respective layers. The bitmap image is a dot matrix image formed by combining multiple pixels, slice layer data is data information included in the pixels, color data of each layer is color data included in the pixels, and structural data of each layer is structural data included in the pixels.

In the embodiment 1, the structural data representing the inner model in the printing layer is represented in a form of first image information, the color data representing the outer model in the printing layer is represented in a form of second image information and the structural data representing the outer model in the printing layer is represented in a form of third image information.

Step S3 may specifically include sub-steps as following:
  S31: performing slicing processing to the inner model to generate the first image information;
  S32: performing slicing processing to the outer model to generate the second image information and the third image information.

Referring to FIG. 8-FIG. 10, after the shell processing and the slicing processing, FIG. 8 shows the first image information including the structural data of the inner model 11 in the printing layer, FIG. 9 shows the third image information including the structural data of the outer model 12 in the printing layer, and FIG. 10 shows the second image information including the color data of the outer model 12 in the printing layer. Since the inner model 11 is located inside the original three-dimensional model 1, it is not needed to include printing a colored interior of the original three-dimensional model 1; however, the outer model 12 includes the surface of the original three-dimensional model 1 which needs to be printed in color.

As an implementable embodiment, both of the first image information and the third image information may be binary image information, that is, pixels of the images are represented with two numerical values of 0 and 1, and the binary image information is represented by a two-dimensional matrix of 0 and 1. And the second image information is 8-bit image information, 16-bit image information, 24-bit image information or 32-bit image information, and a specific type of image information may be determined according to a type of color to be printed, for example, the 24-bit image includes multiple data structures of a combination of (0-255, 0-255, 0-255) formed by an RGB color system, and thus a printing material is specified according to a required color.

The structural data of the first image information represents the printing data required by the inner model 11, the color data of the second image information represents the printing data required by the outer model 12, and the structural data of the third image information represents the printing data required by the outer model 12. Specifically, the printing data includes a type of material and whether to respond to a printing job. For example, the first image information of binary image information includes two data structures of 0 and 1, where 0 represents a background image, not responding to the printing job, and 1 represents responding to the printing job and specifying which type of material to use in the printing; the second image information of 24-bit image includes multiple data structures formed by RGB, representing specifying a printing material; the third image information of binary image information includes two data structures of 0 and 1, where 0 represents not responding to the printing job, and 1 represents responding to the printing job.

It needs to be noted that, the expression that the data structure included in the first image information is 1 and the expression that the data structure included in the third image information is 1 are different. Specifically, the above-mentioned expression that the data structure included in the first image information is 1 may be: responding to the printing job and specifying a material to print, while the expression that the data structure included in the third image information is 1 is: responding to the printing job, but a specific type of material to be used to print is specified by the data structure included in the second image information.

The reason why the printing material is represented by the second image information and whether to respond to the printing job is represented by the third image information is that: the purpose of the present application is to print a full-color model, thus the second image information is represented in full color, the full-color representation also includes the color of the background image (for example the background image is white, and the model also includes a white part), thus only using the second image information cannot represent whether to respond to the printing job clearly, which will lead to the occurrence of the circumstances of not printing or misprinting mentioned in the background. Therefore, the third image information is introduced in the present application to represent whether or not to respond to the printing job to differentiate a color in the second image information that is the same as the color of the background image, which can avoid circumstances of not printing or misprinting effectively.

S4: printing the object to be printed according to the printing data. This step may specifically include the following sub-steps:

S41: determining a structure of the inner model in the printing layer according to the first image information, and determining a structure of the outer model in the printing layer by using the third image information;

S42: printing structures in the printing layer by using a printing material. This step may include the following sub-steps:

S421: printing the structure of the inner model in the printing layer by using a printing material having a preset color;

S422: determining an actual color of the outer model in the printing layer by using the second image information, and printing the structure of the outer model in the printing layer by using a printing material having the actual color.

The above-mentioned printing material with the preset color is preferably white in the present embodiment, compared to other colors, the white color as a basic-layer color can make the color expression of the outer model printed in actual colors richer and more vivid.

It should be noted that, as shown in FIG. 8, it shows first image information of data of a slice layer in the FIG. 7, where the first image information is binary image information, and the color of the background area 13 thereof is represented in white in the image, the corresponding data structure is 0, representing the background part and the outer model 12 in the image, the structural data of the inner model 11 is represented as a black part 111 in the image, the corresponding data structure is 1, representing the part of the inner model 11 in the image where the printing job is responded to and a specified type of material.

As shown in FIG. 9, it shows the third image information of slice layer data in the FIG. 7 corresponding to FIG. 8. The third image information is also binary image information, and the color of the background 13 thereof is represented in white in the image, and the corresponding data structure is 0. Referring to the background area 13 part and the structural data of the inner model 11 in FIG. 8, the data with the data structure of 0 in FIG. 8, which corresponds to the data with the data structure of 0 at the same position in FIG. 7, is the background area 13 part, representing a part where the printing job is not responded to. The data with the data structure of 1 in FIG. 8, which corresponds to the data with the data structure of 0 at the same position in FIG. 9, is the inner model 11, representing a part where the printing job is responded to and specifying an inner material to print. The structural data of the outer model 12 is represented as a black part 121 in FIG. 9, and the corresponding data structure is 1, representing the part of the outer model 12 in the image where the printing job is responded to.

As shown in FIG. 10, it shows second image information of slice layer data in the FIG. 7 corresponding to FIG. 8 and FIG. 9. The second image information is 24-bit image information, and the color of the background 13 thereof is represented in white in the image, the corresponding data structure is (255, 255, 255). The color data of the outer model 12 is represented as a white part 122 in the image, and the corresponding data structure is also (255, 255, 255). Referring to the background area part and the structural data of the outer model 12 in FIG. 9, the data with the data structure of 0 in FIG. 9 which corresponds to the data with the data structure of (255, 255, 255) at the same position in FIG. 10 is the background area 13 part, representing a part where the printing job is not responded to. The data with the data structure of 1 in FIG. 9 which corresponds to the data with the data structure of (255, 255, 255) at the same position in FIG. 10 is the outer model 12, representing a part where the printing job is responded to and specifying the white material to print.

It should be noted that, the lines forming the outline shown in FIG. 10 should not exist in the actual image, herein it is just to visually distinguish between the same background color and model color. For a color in the outer model 12 which is different from the background color, whether to print can be determined only according to the color data in the second image information. The function of the third image information is to solve the problem of whether to print when the color in the second image information is the same as the background color. Thus, if the original model is not in full color, that is, colors included in the original model are different from the background color, then the third image information can be omitted; if the original model is in full color, that is, the original model inevitably includes the same color as the background color, then the third image information is the key to identify which part of the same color needs to be printed.

The embodiment 1 of the present application provides a color 3D printing method, which generates the first image information including the structural data of the inner model, and the third image information and the second image information including the structural data and the color data of the outer model respectively, by performing shell processing and slicing processing to the original three-dimensional model of the acquired object to be printed. Printing by using the printing data formed by the above-mentioned image information can distinguish between the background color and the surface color of the original three-dimensional model in a slice image when the color of the object to be printed is the same as the background color, avoiding phenomena of not printing or misprinting.

Embodiment 2

Figure 11:
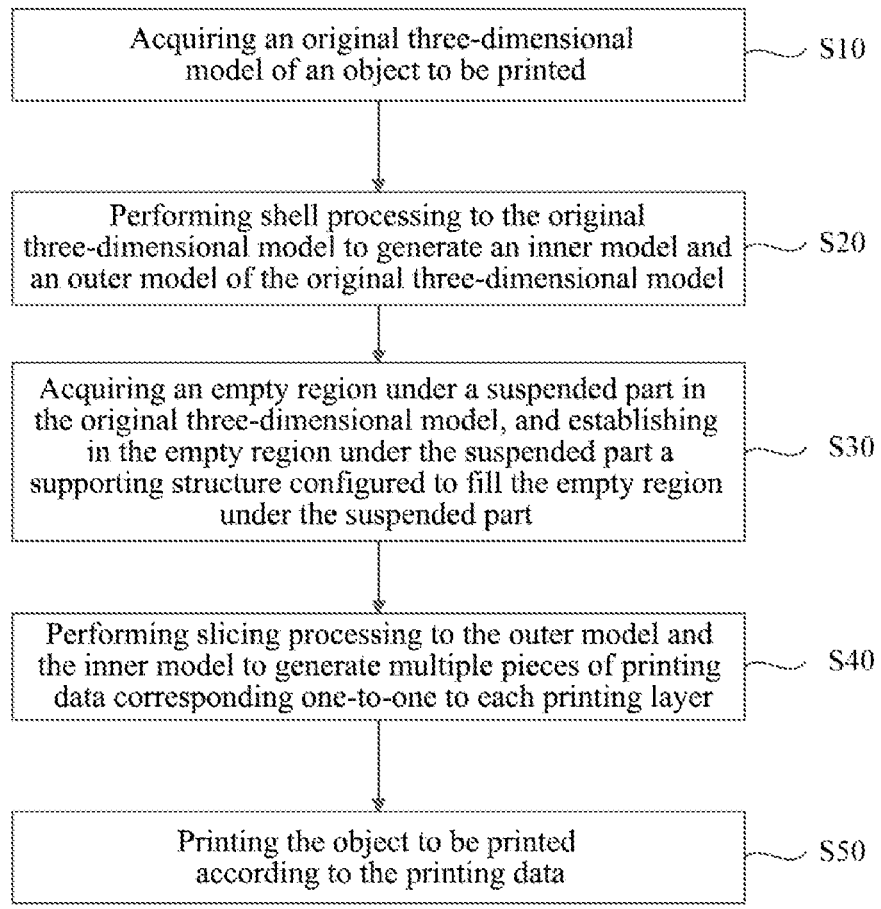
FIG. 11 is a schematic flow chart of a color 3D printing method provided by embodiment 2 of the present application.
Figure 12:
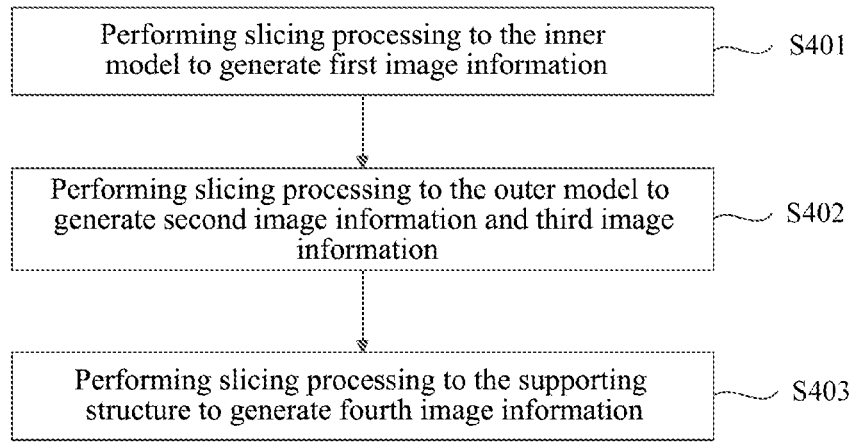
FIG. 12 is a schematic flow chart of a slicing processing step of the color 3D printing method provided by the embodiment 2 of the present application.
Figure 13:
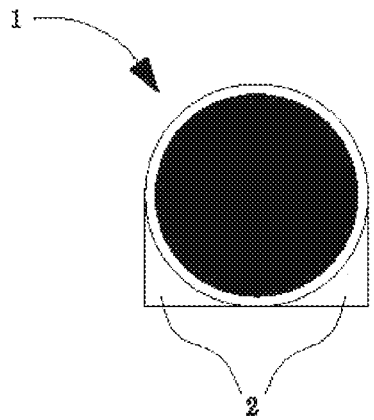
FIG. 13 is a schematic structural diagram of a supporting structure of the color 3D printing method provided by the embodiment 2 of the present application.
Figure 14:
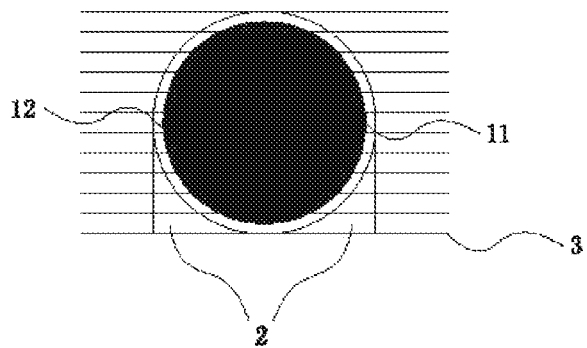
FIG. 14 is a schematic structural diagram of the slicing processing to the outer model, the inner model and the supporting structure of the color 3D printing method provided by the embodiment 2 of the present application.

FIG. 11 is a schematic flow chart of a color 3D printing method provided by the embodiment 2 of the present application. FIG. 12 is a schematic flow chart of a slicing processing step of the color 3D printing method provided by the embodiment 2 of the present application. FIG. 13 is a schematic structural diagram of a supporting structure of the color 3D printing method provided by the embodiment 2 of the present application. FIG. 14 is a schematic structural diagram of the slicing processing to the outer model, the inner model and the supporting structure of the color 3D printing method provided by the embodiment 2 of the present application.

As shown in FIG. 11-FIG. 14, on the basis of the above-mentioned embodiment 1, the embodiment 2 of the present application further provides another color 3D printing method, which can print an empty region under a suspended part in an original three-dimensional model 1, and the specific method can be:

S10: acquiring an original three-dimensional model in an object to be printed;

S20: performing shell processing to the original three-dimensional model to generate an inner model and an outer model of the original three-dimensional model;

S40: performing slicing processing to the inner model and the outer model to generate multiple printing data corresponding one-to-one with each printing layer;

S50: printing the object to be printed according to the printing data.

In step S40, before the step of performing slicing processing to the inner model and the outer model to generate multiple printing data corresponding one-to-one with each printing layer, it may further include:

S30: acquiring an empty region under a suspended part in the original three-dimensional model, and establishing, in the empty region under the suspended part, a supporting structure configured to fill the empty region under the suspended part.

It should be noted that, the processing methods of acquiring an original three-dimensional model of an object to be printed in S10, performing shell processing to the original three-dimensional model to generate an inner model and an outer model of the original three-dimensional model in S20, performing slicing processing to the inner model and the outer model to generate multiple printing data corresponding one-to-one with each printing layer in S40 and printing the object to be printed according to the printing data in S50 are the same as S1, S2, S3 and S4 in embodiment 1, respectively, and will not be repeated here. Further, when performing scan processing and shell processing to the original three-dimensional model 1 in the present embodiment, scanning can be performed to the empty region under the suspended part in the original three-dimensional model 1, and the supporting structure 2 can be established in the empty region under the suspended part. For the method of establishing the supporting structure 2, reference can be made to the prior art, for example, the method of generating a supporting structure in patent documents with numbers of U.S. Pat. No. 8,818,544B2, U.S. Pat. No. 6,907,307B2, CN107727189A, which will not be introduced in detail in the present application.

Further, referring to FIG. 12-FIG. 14, the performing slicing processing to the inner model and the outer model to generate multiple printing data corresponding one-to-one with each printing layer in S40, may specifically include the following sub-steps:

S401: performing slicing processing to the inner model to generate first image information;

S402: performing slicing processing to the outer model to generate second image information and third image information.

S403: performing slicing processing to the supporting structure to generate fourth image information.

It should be noted that, the processing methods of performing slicing processing to the inner model to generate first image information in S401 and performing slicing processing to the outer model to generate second image information and third image information in S402 are the same as S31 and S32 in the embodiment 1, respectively, and will not be repeated here. Further, after generating a supporting structure 2 for the original three-dimensional model 1 in the present embodiment, slicing processing is performed simultaneously to the supporting structure 2, the inner model 11 and the outer model 12 as a whole. Here, similar to the slicing processing process to the inner model 11 and the outer model 12 in the embodiment 1 to generate slice layer data represented by multiple dot matrix images is generated. The dot matrix image formed by the supporting structure 2 is data of the supporting structure, which is defined as fourth image information in the present embodiment. Here, the slice layer data can also include the above-mentioned first image information, second image information and the third image information, and the data structure thereof is as mentioned above, which will not be repeated here.

Further, the printing the object to be printed according to the printing data, may specifically include the following sub-steps:

S511: determining a structure of the inner model in the printing layer according to the first image information, determining a structure of the outer model in the printing layer by using the third image information, and determining a structure of the supporting structure in the printing layer according to the fourth image information;

S512: printing structures in the printing layer by using a printing material.

The fourth image information included in the printing data is used to represent the structural data of the supporting structure 2. The fourth image information is preferably binary image information. The structural data of the fourth image information represents the printing information required by the supporting structure 2, and the printing information includes a type of material and whether to respond to a printing job. For example, the fourth image information of the binary image includes two data structures of 0 and 1, where 0 represents the background image, not responding to the printing job, and 1 represents responding to the printing job and specifying printing by using a supporting material.

The embodiment 2 of the present application provides a color 3D printing method, which generates the first image information including the structural data of the inner model, the third image information and the second image information including the structural data and the color data of the outer model, respectively, by performing shell processing and slicing processing to the original three-dimensional model of the acquired object to be printed, and generates the fourth image information including the structural data of the supporting structure by establishing the supporting structure in the empty region under the suspended part of the original three-dimensional model. Printing by using the printing data formed by the above-mentioned image information can distinguish between the background color and the surface color of the original three-dimensional model in a slice image when the color of the object to be printed is the same as the background color, avoiding phenomena of not printing or misprinting.

Embodiment 3

On the basis of the above-mentioned embodiment 1 and embodiment 2, the embodiment 3 of the present application further provides a 3D printing method, which can perform integration processing to the first image information, the third image information and the fourth image information.

Specifically, before printing the object to be printed according to the printing data in the embodiment 2, it may further include:

performing integration processing to the first image information, the third image information and the fourth image information to generate fifth image information.

It should be noted that, the data storage amount of the first image information, the third image information and the fourth image information of binary image information in the embodiment 1 and embodiment 2 are all 1 bit, and the data storage amount of the second image information of 24-bit image is 24 bits, with a total data storage amount of 27 bits. In order to save data storage amount, the data processing method provided by the embodiment of the present application further includes integration processing, and for the method of integration processing, reference may be made to the prior art, for example, patent documents with numbers of CN103605715B and CN105183824A, which will not be repeated in the present embodiment.

The fifth image information after integration processing includes the first image information, the third image information and the fourth image information, the fifth image information can be a 4-value image, including four data structures of 00, 01, 10 and 11, and the four data structures are given different representations, which, for example, may be that 00 represents not responding to the printing job for the background image, 01 represents responding to the printing job and specifying a material to print for the inner model, 10 represents responding to the printing job for the outer model and a specific type of material to use in printing is specified by the data in the second image information, 11 represents responding to the printing job and specifying the supporting material to print for the supporting structure. The data storage amount of the fifth image information of the 4-value image is 2 bits, and in combination with the data storage amount of 24 bit for the second image of 24-bit image, a total data storage amount is 26 bits, which effectively decreased the data storage amount of the slice layer data compared with that before the integration processing.

Further, the step of printing the object to be printed according to the printing data in the embodiment 3 may specifically include the following sub-steps:

determining a structure in the printing layer according to the second image information and the fifth image information, and determining an actual color of the outer model in the printing layer according to the second image information;

printing the structure in the printing layer by using a printing material, where the printing material includes a printing material having the actual color of the outer model in the printing layer.

It should be noted that, when printing the object to be printed according to the printing data, the printing data includes the second image information and the fifth image information, where the fifth image information includes the structural data of the inner model, the outer model and the supporting structure, so as to determine whether to respond to the printing job in the printing process for the above-mentioned three structures. The second image information determines the specific color information of the printing material to be used for the outer model when the printing job is responded to. The printing material may include multiple colors, at least one of the multiple colors should correspond to the color of the printing material required by the outer model.

The embodiment 3 of the present application provides a color 3D printing method, which generates the first image information including the structural data of the inner model, and the third image information and the second image information including the structural data and the color data of the outer model, respectively, by performing shell processing and slicing processing to the original three-dimensional model of the acquired object to be printed, and generates the fourth image information including the structural data of the supporting structure by establishing the supporting structure in the empty region under the suspended part of the original three-dimensional model. In addition, the first image information, the third image information and the fourth image information, which are all binary image information, are integrated into the fifth image information by a method of integration processing, and printing is performed by using the printing data formed by the above-mentioned image information, which can distinguish between the background color and the surface color of the original three-dimensional model in a slice image when the color of the object to be printed is the same as the background color, avoiding phenomena of not printing or misprinting, and effectively decreasing the data storage amount of the printing data.

Embodiment 4

Figure 15:
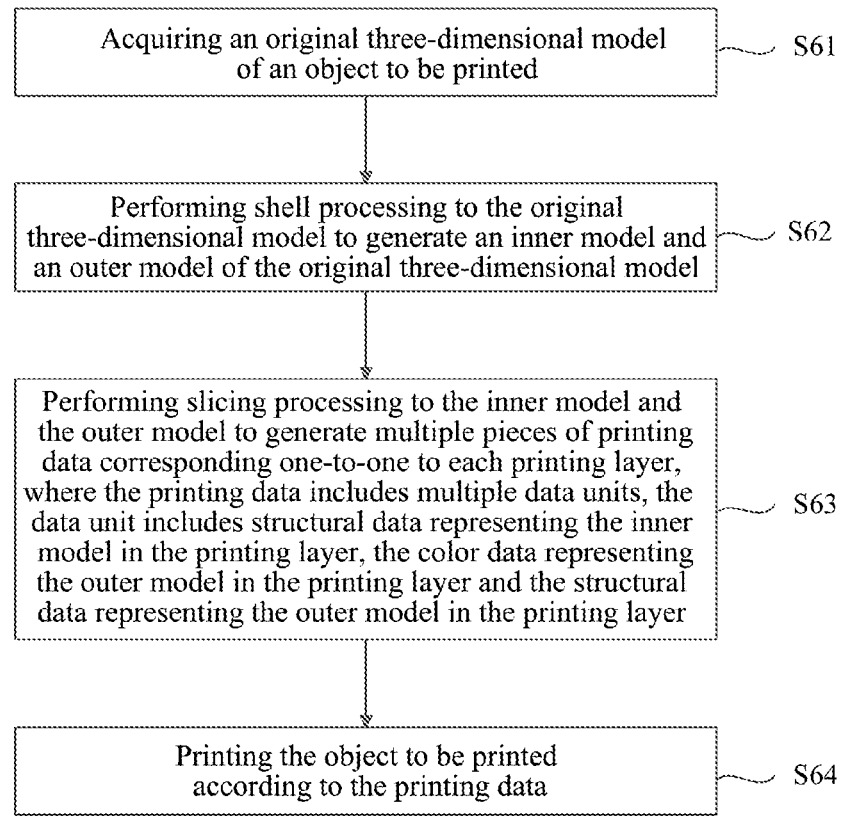
FIG. 15 is a schematic flow chart of a color 3D printing method provided by embodiment 4 of the present application.
Figure 16:
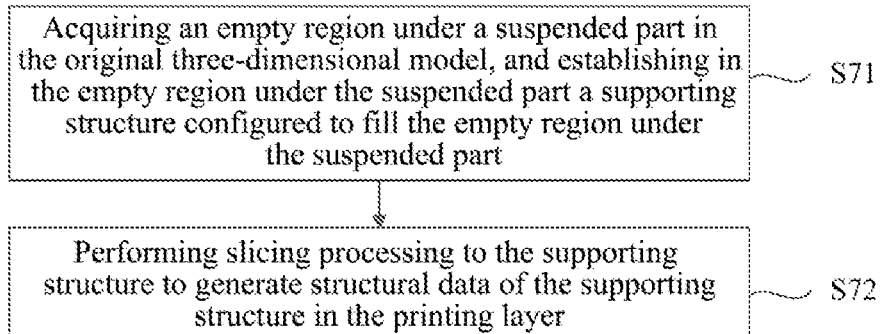
FIG. 16 is a schematic flow chart of a slicing processing step to a supporting structure of the color 3D printing method provided by the embodiment 4 of the present application.

FIG. 15 is a schematic flow chart of a color 3D printing method provided by the embodiment 4 of the present application. FIG. 16 is a schematic flow chart of a slicing processing step to a supporting structure of the color 3D printing method provided by the embodiment 4 of the present application. Referring to FIG. 15 and FIG. 16, on the basis of the embodiment 1 and the embodiment 2, the embodiment 4 of the present application further provides another color 3D printing method, and comparing the embodiment 4 to the embodiment 1 and the embodiment 2, the difference lies in that: the printing data includes multiple data units, and each data unit includes data of different types. Specifically, the 3D color printing method provided by the present embodiment includes:

- S61: acquiring an original three-dimensional model of an object to be printed;
- S62: performing shell processing to the original three-dimensional model to generate an inner model and an outer model of the original three-dimensional model;
- S63: performing slicing processing to the inner model and the outer model to generating multiple printing data corresponding one-to-one with each printing layer, where the printing data includes multiple data units, and the data unit includes structural data representing the inner model at a printing layer, color data representing the outer model at the printing layer, and structural data representing the outer model at the printing layer;
- S64: printing the object to be printed according to the printing data.

The performing slicing processing to the inner model and the outer model to generate multiple printing data corresponding one-to-one with each printing layer specifically includes: performing slicing processing to the inner model to generate the structural data of the inner model; performing slicing processing to the outer model to generate the structural data and the color data of the outer model.

The printing the object to be printed according to the printing data specifically includes: printing a structure of the inner model in the printing layer by using a printing material with a preset color and according to the structural data of the inner model; determining an actual color of the outer model in the printing layer by using the color data of the outer model, and printing a structure of the outer model in the printing layer by using a printing material having the actual color and according to the structural data of the outer model.

Specifically, the performing slicing processing to the inner model and the outer model in the above-mentioned method is different from the embodiment 1 to the embodiment 3, the present embodiment does not generate bitmap images when slicing, but generates printing data according to the data of the inner model and the outer model, and directly stores the printing data in a data storage area. The printing data includes multiple data units, the data unit includes the color data and the structural data, which specifically include the color data and the structural data of the outer model and the structural data of the inner model in the printing layer.

Further, before performing slicing processing to the inner model and the outer model to generate multiple printing data corresponding one-to-one with each printing layer, further include:

- S71: acquiring an empty region under a suspended part in the original three-dimensional model, and establishing, in the empty region under the suspended part, a supporting structure configured to fill the empty region under the suspended part.

The performing slicing processing to the inner model and the outer model to generate multiple printing data corresponding one-to-one with each printing layer specifically further includes:

- S72: performing slicing processing to the supporting structure to generate structural data of the supporting structure in the printing layer.

It should be noted that, the representation of the above-mentioned structural data of the inner model, the color data of the outer model, the structural data of the outer model and the structural data of the supporting structure is consistent with the representation of the structural data of the first image information, the color data of the second image information, the structural data of the third image information and the structural data of the fourth image information in the embodiments 1 and 2 respectively, or is consistent with the representation of the structural data of the inner model of the fifth image information, the color data of the second image information, the structural data of the outer model of the fifth image information and the structural data of the supporting structure of the fifth image information in the embodiment 3, respectively, and reference can be made to the content of the embodiments 1 and 2 or the embodiment 3 for the details, which will not be repeated herein.

Similar to distinguishing between the same color in the second image information and the background image by the structural data of the third image information in the embodiments 1 to 3, the present embodiment distinguishes between the same color in the outer model and the background image by the structural data of the outer model in the data unit, and reference can be made to the embodiments 1 to 3 for the details, which will not be repeated herein.

The structural data representing the inner model in the printing layer, the color data representing the outer model in the printing layer and the structural data representing the outer model in the printing layer in the data unit are data from different storage areas, respectively.

Specifically, the structural data representing the inner model in the printing layer is stored in a first storage area in an order of relative position in a coordinate system, the color data representing the outer model in the printing layer is stored in a second storage area in the order of relative position in the coordinate system, the structural data representing the outer model in the printing layer is stored in a third storage area in the order of relative position in the coordinate system, and the structural data of the supporting structure is stored in a fourth storage area of the storage area in the order of relative position in the coordinate system.

In addition, the printing the object to be printed according to the printing data further specifically includes: acquiring printing data in the first storage area, the second storage area, the third storage area and the fourth storage area according to a preset storage order, and printing the object to be printed according to the acquired printing data from different storage areas.

It should be noted that, the first storage area, the second storage area, the third storage area and the fourth storage area in the present embodiment are not necessarily representing a sequential order of the first, the second, the third and the fourth, but to distinguish between different storage areas, and a specific order may be the first, the second, the third and the fourth, or may be the second, the third, the fourth and the first; or may be the third, the first, the second and the fourth; or may be other orders. An order of storing the data in the data unit in the present embodiment is the same as the order of arranging the different storage areas.

As an example, the structural data of the inner model is stored in the first storage area in the order of relative position in the coordinate system, the color data of the outer model is stored in the second storage area in the order of relative position in the coordinate system, the structural data of the outer model is stored in the third storage area in the order of relative position in the coordinate system, and the structural data of the supporting structure is stored in the fourth storage area in the order of relative position in the coordinate system. The first storage area, the second storage area, the third storage area and the fourth storage area are arranged in sequence, and during printing, the structural data of the inner model in the first storage area, the color data of the outer model in the second storage area, the structural data of the outer model in the third storage area and the structural data of the supporting structure in the fourth storage area are respectively retrieved to constitute a data unit, according to which the printing is performed. For example, a data unit may be (0, 255, 255, 255, 0, 0), where the first value of 0 is a binary value of the structural data of the inner model, which represents not an inner model and is stored in the first storage area, the second, the third and the fourth value of (255, 255, 255) are RBG values of the color data, which represent the white color and are stored in the second storage area, the fifth value of 0 is the structural data of the outer model, which represents not an outer model and is stored in the third storage area, and the sixth value of 0 is the structural data of the supporting structure, which represents not a supporting structure and is stored in the fourth storage area. By analyzing the different data representations in the data unit, it can be determined that the data unit represents the background color. For another example, a data unit may be (0, 255, 255, 255, 1, 0), where the first value of 0 is a binary value of the structural data of the inner model, which represents not an inner model and is stored in the first storage area, the second, the third, the fourth value of (255, 255, 255) are RBG values of the color data, which represent the white color and are stored in the second storage area, the fifth value of 1 is the structural data of the outer model, which represents an outer model and is stored in the third storage area, and the sixth value of 0 is the structural data of the supporting structure, which represents not a supporting structure and is stored in the fourth storage area. By analyzing the different data representations in the data unit, it can be determined that the data unit represents the outer model.

The embodiment 4 of the present application provides a color 3D printing method, which generates the data unit including the structural data of the inner model, the structural data and the color data of the outer model, and/or the structural data of the supporting structure by performing shell processing and slicing processing to the original three-dimensional model of the acquired object to be printed. Printing by using the printing data in the data unit can distinguish between the background color and the surface color of the original three-dimensional model in a slice image when the color of the object to be printed is the same as the background color, avoiding phenomena of not printing or misprinting.

Embodiment 5

On the basis of the above-mentioned embodiment 4, the embodiment 5 of the present application further provides another color 3D printing method. The difference between the embodiment 5 and the embodiment 4 lies in that: the structural data of the inner model, the color data of the outer model, the structural data of the outer model and the structural data of the supporting structure in the embodiment 5 are stored independently in different storage areas, respectively.

Specifically, for example, the structural data of the inner model is stored in a first storage area, the color data of the outer model is stored in a second storage area, the structural data of the outer model is stored in a third storage area, the structural data of the supporting structure is stored in a fourth storage area, and the first storage area, the second storage area, the third storage area and the fourth storage area do not have a specified arranging order. Correspondingly, the order of storing the data in the data unit may be variable. For example, a data unit of (0, 255, 255, 255, 1, 0) is taken as an example, where the first value of 0 is a binary value of the structural data of the inner model, which represents not an inner model and is stored in the first storage area, the second, the third and the fourth values of (255, 255, 255) are RBG values of the color data, which represent the white color and are stored in the second storage area, the fifth value of 1 is the structural data of the outer model, which represents an outer model and is stored in the third storage area, and the sixth value of 0 is the structural data of the supporting structure, which represents not a supporting structure and is stored in the fourth storage area. By analyzing the different data representations in the data unit, it can be determined that the data unit represents the outer model. The data unit representing the outer model in the present embodiment may also be (1, 255, 255, 255, 0, 0), where the first value of 1 is a binary value of the structural data of the outer model, which represents an outer model and is stored in the third storage area, the second, the third and the fourth values of (255, 255, 255) are RBG values of the color data, which represent the white color and are stored in the second storage area, the fifth value of 0 is the structural data of the non-inner model, which represents not an inner model and is stored in the first storage area, and the sixth value of 0 is the structural data of the supporting structure, which represents not a supporting structure and is stored in the fourth storage area. By using the printing data storage method, dynamic management can be realized to facilitate the storage and retrieval of the data.

The embodiment 5 of the present application provides a color 3D printing method, which generates the data unit including the structural data of the inner model, the structural data and the color data of the outer model, and/or the structural data of the supporting structure by performing shell processing and slicing processing to the original three-dimensional model of the acquired object to be printed. Printing by using the printing data in the data unit can distinguish between the background color and the surface color of the original three-dimensional model in a slice image when the color of the object to be printed is the same as the background color, avoiding phenomena of not printing or misprinting.

Embodiment 6

On the basis of the above-mentioned embodiment 4, the embodiment 6 of the present application further provides another color 3D printing method. The difference between the embodiment 6 and the embodiment 4 lies in that: the storage area is not divided in the embodiment 6, the structural data of the inner model, the color data of the outer model, the structural data of the outer model and the structural data of the supporting structure are stored in a same storage area.

Specifically, the data unit includes the color data and the structural data of the outer model, the structural data of the inner model and the structural data of the supporting structure in the printing layer, the data in a single data unit can be stored in a specified order. The color data and the structural data of the outer model, the structural data of the inner model and the structural data of the supporting structure are stored in the same storage area in the order of relative position in the coordinate system.

As an example, the data unit includes RGB values of the color data of the outer model, a binary value of the structure data of the outer model, a binary value of the structure data of the inner model and a binary value of the structure data of the supporting structure. For example, a data unit may be (255, 255, 255, 0, 0, 0), where the first three values of (255, 255, 255) are the RGB values of the color data and represent the white color, the fourth value of 0 is a binary value of the structural data of the outer model and represents not an outer model, then with reference to the RGB values of the color data, the color data of the data unit represents the background color, the fifth value of 0 is the structural data of the inner model and represents not an inner model, and the sixth value of 0 is the structural data of the supporting structure and represents not a supporting structure. By analyzing the different data representations of the data unit, it can be determined that the data unit represents the background color. For another example, a data unit may be (255, 255, 255, 1, 0, 0), where the first three values of (255, 255, 255) are the RGB values of the color data of the outer model and represent the white color, the fourth value of 1 is a binary value of the structural data of the outer model and represents the color is of the outer model, the fifth value of 0 is the structural data of the inner model and represents not an inner model, and the sixth value of 0 is the structural data of the supporting structure and represents not a supporting structure. By analyzing the different data representations of the data unit, it can be determined that the data unit represents the outer model. For still another example, a data unit may be (a, b, c, 0, 1, 0), where the first three values of (a, b, c) are the RGB values of the color data of the outer model, the fourth value of 0 is a binary value of the structural data of the outer model and represents not an outer model, the fifth value of 1 is the structural data of the inner model and represents an inner model, and the sixth value of 0 is the structural data of the supporting structure and represents not a supporting structure. By analyzing the different data representations of the data unit, it can be determined that the data unit represents the inner model. For yet another example, a data unit may be (a, b, c, 0, 0, 1), where the first three values of (a, b, c) are the RGB values of the color data of the outer model, the fourth value of 0 is a binary value of the structural data of the outer model and represents not an outer model, the fifth value of 0 is the structural data of the inner model and represents not an inner model, and the sixth value of 1 is the structural data of the supporting structure and represents a supporting structure. By analyzing the different data representations of the data unit, it can be determined that the data unit represents the supporting structure.

Among the structural data of the outer model, the structural data of the inner model and the structural data of the supporting structure of the data unit in the above-mentioned embodiment, there is only one of them being true or all three of them being false. When there is only one of them being true, the data unit represents the outer model or the inner model or the supporting structure which is corresponding to true. When all three of them are false, the data unit represents the background color. For example, in the above-mentioned examples, the structural data of the inner model in the data unit (a, b, c, 0, 1, 0) is true, then the representation of values (a, b, c) is meaningless, because the structural data of the outer model is false, and the data unit represents not an outer model, and meanwhile, the structural data of the supporting structure is false, thus the data unit represents the inner model. It holds true for the data unit (a, b, c, 0, 0, 1) as well. When one of the structural data of the inner model and the structural data of the supporting structure is true, values (a, b, c) may be any RGB values preset. Therefore, when the printing is performed according to the data unit, priority should be given to judging whether the structural data of the outer model, the structural model of the inner model and the structural data of the supporting structure is true or false, to determine whether the data unit represents the outer model or the inner model or the supporting structure or the background color, and when the data unit represents the outer model, then the color data of the outer model is analyzed to determine the color of the outer model.

It should be noted that, the above-mentioned values (255, 255, 255), (a, b, c) are described with RGB values for convenience of understanding, which should actually be binary values in a storage space.

As another further embodiment method of the present embodiment, the printing data may be stored in sections and managed dynamically in the above-mentioned implementations of the present embodiment to facilitate the storage and retrieval of the data.

The method of distinguishing between the color of the outer model and the background image in the present embodiment is the same as that in the above-mentioned embodiments 1 to 3, which are both distinguishing according to the structural data of the outer model in combination with the color data of the outer model. The difference is that the data after slicing processing is stored in the form of an image in the embodiments 1 to 3, and the data after slice processing is directly stored in the storage space in the present embodiment.

The embodiment 6 of the present application provides a color 3D printing method, which generates the data unit including the structural data of the inner model, the structural data and the color data of the outer model, and/or the structural data of the supporting structure by performing shell processing and slicing processing to the original three-dimensional model of the acquired object to be printed. Printing by using the printing data in the data unit can distinguish between the background color and the surface color of the original three-dimensional model in a slice image when the color of the object to be printed is the same as the background color, avoiding phenomena of not printing or misprinting.

Embodiment 7

Figure 17:
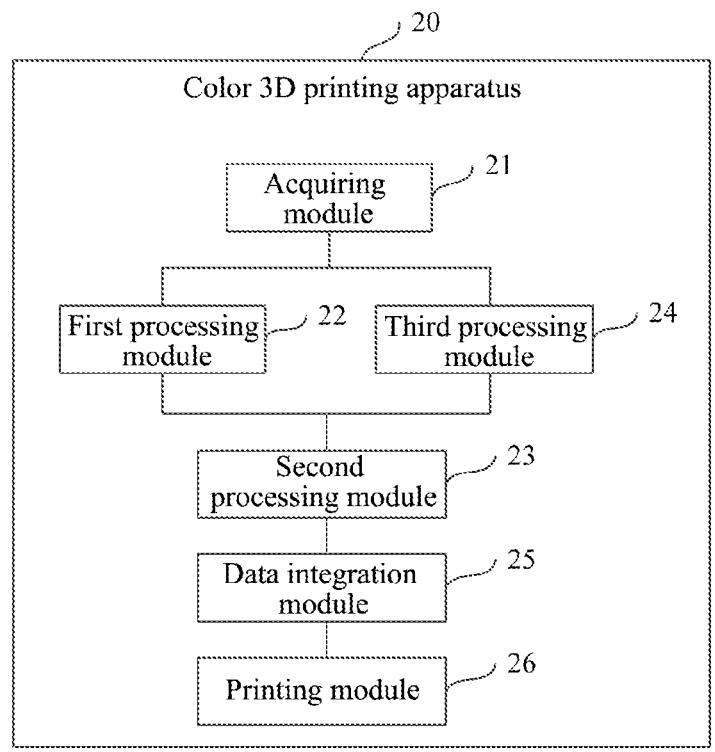
FIG. 17 is a schematic structural diagram of a color 3D printing apparatus provided by embodiment 7 of the present application.

FIG. 17 is a schematic structural diagram of a color 3D printing apparatus provided by the embodiment 7 of the present application. As shown in FIG. 17, on the basis of the above-mentioned embodiments 1 to 6, the embodiment 7 of the present application further provides a color 3D printing apparatus 20, including:

An acquiring module 21, configured to acquire an original three-dimensional model of an object to be printed. The acquiring module may be implemented by a method of scanning the object to be printed when acquiring the original three-dimensional model, the format of the scanned information of the original three-dimensional model can be transformed, to prepare for the slicing processing procedure.

A first processing module 22, configured to perform shell processing to the original three-dimensional model, and generate an inner model and an outer model of the original three-dimensional model. The color 3D printing apparatus 20 provided by the present embodiment is to print the inner model and the outer model of the original three-dimensional model respectively, and finally obtain a complete printing product of the object to be printed. Here, a wall thickness in the shell processing may be set according to requirements, the wall thickness needs to ensure both of the inner model and the outer model formed by the shell processing have good mechanical strength.

A second processing module 23, configured to perform slicing processing to the inner model and the outer model to generate multiple printing data corresponding one-to-one with each printing layer, the printing data including structural data representing the inner model in a printing layer, color data representing the outer model in the printing layer, and structural data representing the outer model in the printing layer.

Specifically, description will be made by taking the structural data and the color data represented in the form of image information as an example. The printing data includes first image information used to represent the structural data of the inner model in the printing layer, the second image information used to represent the color data of the outer model in the printing layer and the third image information used to represent the structural data of the outer model in the printing layer.

The first image information provided by the present embodiment can decide whether to respond to the printing job when the inner model is being printed, and then whether to print the inner model is determined. The third image information can decide whether to respond to the printing job when the outer model is being printed, and then whether to print the outer model is determined, and meanwhile, since the outer model has colors, in order to avoid the problem of not printing or misprinting caused by that the color of the outer model and the color of the background are the same, the present embodiment further sets second image information including the color of the outer model, and the color of the printing material of the outer model is determined by the second image information, while whether to print the outer model is decided by the third image information, thus effectively avoiding the circumstances of not printing or misprinting when the color of the outer model and the color of the background are the same.

Further, the color 3D printing apparatus 20 provided by the present embodiment may further include a third processing module 24 and a data integration module 25.

The third processing module 24 is configured to acquire an empty region under a suspended part in the original three-dimensional model, and establish, in the empty region under the suspended part, a supporting structure configured to fill the empty region under the suspended part. The second processing module 23 is further configured to perform slicing processing to the supporting structure to generate fourth image information.

It should be noted that, since there will exist an empty region under a suspended part in the current object to be printed, in order to ensure the similarity of the printing product and the object to be printed, the empty region under the suspended part can be printed in the printing process as well. When scan processing or shell processing is performed to the original three-dimensional model 1, scanning can be performed to the empty region under the suspended part of the original three-dimensional model 1, and a supporting structure 2 supporting the empty region under the suspended part can be established in the empty region under the suspended part. For the method of establishing the supporting structure 2, reference can be made to the prior art, which will not be repeated here in the present embodiment.

In addition, after the original three-dimensional model 1 including the supporting structure is established, the second processing module 23 can be used to perform the same slicing processing to the supporting structure 2, to acquire the fourth image information including the structure data of the supporting structure 2.

Further, in order to decrease the data storage amount, the data integration module 25 in the color 3D printing apparatus 20 is configured to perform integration processing to the first image information, the second image information and the fourth image information, to generate fifth image information.

A printing module 26 is configured to print the object to be printed according to the printing data. When the printing module provided by the present embodiment is printing according to the above-mentioned printing data, it can print multiple layers layer by layer, to obtain a complete printing product.

Specifically, the second processing module 23 is configured to perform slicing processing to the inner model and the outer model to generate multiple printing data corresponding one-to-one with each printing layer. Description will be made by taking the printing data including multiple data units as an example.

The printing data includes multiple data units, the data unit includes structural data representing the inner model in the printing layer, color data representing the outer model in the printing layer and structural data representing the outer model in the printing layer. The structural data representing the inner model in the printing layer, color data representing the outer model in the printing layer and structural data representing the outer model in the printing layer are data from different storage areas, respectively.

Specifically, the structural data representing the inner model in the printing layer is stored in a first storage area in an order of relative position in a coordinate system, the color data representing the outer model in the printing layer is stored in a second storage area in the order of relative position in the coordinate system, the structural data representing the outer model in the printing layer is stored in a third storage area in the order of relative position in the coordinate system, and the structural data of the supporting structure is stored in a fourth storage area of a storage area in the order of relative position in the coordinate system.

In addition, in the printing module 26, the printing data in the first storage area, the second storage area, the third storage area and the fourth storage area are acquired according to a preset storage order, and the object to be printed is printed according to the acquired printing data from different storage areas.

It should be noted that, the first storage area, the second storage area, the third storage area and the fourth storage area in the present embodiment are not necessarily representing the sequential order of the first, the second, the third and the fourth, but to distinguish between different storage areas, and a specific order may be the first, the second, the third and the fourth; or, may be the second, the third, the fourth and the first; or, may be the third, the first, the second and the fourth; or, may be other orders. The order of storing the data in the data unit in the present embodiment is the same as the order of arranging the different storage areas.

As an example, the structural data of the inner model is stored in the first storage area in the order of relative position in the coordinate system, the color data of the outer model is stored in the second storage area in the order of relative position in the coordinate system, the structural data of the outer model is stored in the third storage area in the order of relative position in the coordinate system, and the structural data of the supporting structure is stored in the fourth storage area in the order of relative position in the coordinate system. The first storage area, the second storage area, the third storage area and the fourth storage area are arranged in order, and the structural data of the inner model in the first storage area, the color data of the outer model in the second storage area, the structural data of the outer model in the third storage area and the structural data of the supporting structure in the fourth storage area are respectively retrieved while printing, to constitute the data unit, according to which the printing is performed.

Specifically, the second processing module 23 is configured to perform slicing processing to the inner model and the outer model to generate multiple printing data corresponding one-to-one to each printing layer, the printing data includes multiple data units, and description will be made by taking the structural data of the inner model, the color data of the outer model, the structural data of the outer model and the structural data of the supporting structure being independently stored in different storage areas respectively as an example.

Specifically, for example, the structural data of the inner model is stored in the first storage area, the color data of the outer model is stored in the second storage area, the structural data of the outer model is stored in the third storage area and the structural data of the supporting structure is stored in the fourth storage area, and the first storage area, the second storage area, the third storage area and the fourth storage area do not have a specified arranging order. Correspondingly, the order of storing the data in the data unit can be variable. By using the printing data storage method in the embodiment, dynamic management can be realized to facilitate the storage and retrieval of the data.

Specifically, the second processing module 23 is configured to perform slicing processing to the inner model and the outer model to generate multiple printing data corresponding one-to-one to each printing layer, the printing data includes multiple data units, and description will be made by taking the structural data of the inner model, the color data of the outer model, the structural data of the outer model and the structural data of the supporting structure being stored in a same storage area as an example.

Specifically, the data unit includes the color data and structural data of the outer model, the structural data of the inner model, and the structural data of the supporting structure in the printing layer, and the data in a single data unit may be stored in a specified order. The color data and the structural data of the outer model, the structural data of the inner model and the structural data of the supporting structure are stored in the same storage area in the order of relative position in the coordinate system.

A specific example of forming the data unit is as shown in the embodiment 6 above, and will not be repeated here.

Other technical features are the same as the embodiment 1 to the embodiment 6, and the same technical effects can be achieved, which will not be repeated here.

The embodiment 7 of the present application provides a color 3D printing apparatus, which generates the printing data including the structural data of the inner model and the structural data and the color data of the outer model, respectively, by performing shell processing and slicing processing to the original three-dimensional model of the acquired object to be printed. Printing by using the printing data can distinguish between the background color and the surface color of the original three-dimensional model in a slice image when the color of the object to be printed is the same as the background color, avoiding phenomena of not printing or misprinting.

Embodiment 8

Figure 18:
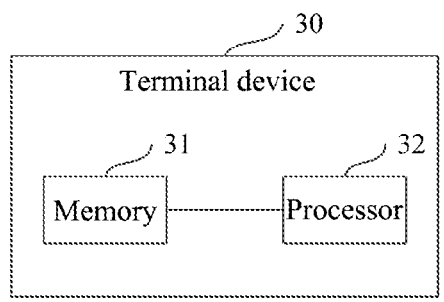
FIG. 18 is a schematic structural diagram of a terminal device provided by embodiment 8 of the present application.

FIG. 18 is a schematic structural diagram of a terminal device provided by the embodiment 8 of the present application. Referring to FIG. 18, on the basis of the above-mentioned embodiment 1 to embodiment 6, the embodiment 8 of the present application further provides a terminal device 30, including: a memory 31, a processor 32 and a computer program stored in the memory 31 and runnable on the processor 32, and the above-mentioned color 3D printing method is implemented when the processor 32 runs the computer program.

When the terminal device in the embodiment of the present application is in operation, the processor 32 calls the computer program stored in the memory 31, to complete the color 3D printing method in the computer program. The memory 31 may include, but not limited to: a random access memory (RAM), a flash memory, a read-only memory (ROM), an erasable programmable read only memory (EPROM) memory, a hard disk, or any other forms of storage media known in the art.

Hardware of the processor 32 may be a general processor, a digital signal processor (DSP), an application specific integrated circuit (ASIC), a field-programmable gate array (FPGA) or other programmable logic devices, discrete gates or transistor logic devices, discrete hardware components, or a combination of these hardware which can implement the specific function. As a variation, it can also be implemented by a combination of computing devices, for example, a combination of a DSP and a micro-processor, a combination of multiple micro-processors, a combination of one or more micro-processors communicatively combined with a DSP, etc.

When the present solution is practically applied, the memory 31 may be integrated with the processor 32, and it is set in a manner that the memory 31 is a component of the processor 32, or both of the memory 31 and the processor 32 are set on the application specific integrated circuit (ASIC).

Other technical features are the same as the embodiment 1 to the embodiment 6, and the same technical effects can be achieved, which will not be repeated here.

The embodiment 8 of the present application provides a terminal device, which generates the printing data including the structural data of the inner model, and the printing data including the structural data and the color data of the outer model respectively by performing shell processing and slicing processing to the original three-dimensional model of the acquired object to be printed. Printing by using the printing data can distinguish between the background color and the surface color of the original three-dimensional model in a slice image when the color of the object to be printed is the same as the background color, avoiding phenomena of not printing or misprinting.

Embodiment 9

On the basis of the above-mentioned embodiments 1 to 8, the embodiment 9 of the present application provides a computer-readable storage medium. Specifically, the computer-readable storage medium has a computer program stored thereon, and the above-mentioned color 3D printing method is implemented when the computer program is executed by a processor.

The computer-readable storage medium may be a hard disk, a U disk, an optical disk or other devices having a storage space.

Other technical features are the same as the embodiment 1 to the embodiment 8, and the same technical effects can be achieved, which will not be repeated here.

The embodiment 9 of the present application provides a computer-readable storage medium, which generates the printing data including the structural data of the inner model, and the printing data including the structural data and the color data of the outer model respectively by performing shell processing and slicing processing to the original three-dimensional model of the acquired object to be printed. Printing by using the printing data formed by the above-mentioned image information can distinguish between the background color and the surface color of the original three-dimensional model in a slice image when the color of the object to be printed is the same as the background color, avoiding phenomena of not printing or misprinting.

The terms "first", "second", "third", "fourth", etc. (if any) in the description, the claims and the above-mentioned appended drawings of the present application are used to distinguish between similar objects, but do not need to describe a specific order or sequence. It should be understood that the data used in such way can be interchanged in proper circumstances, so that the embodiments of the present application, for example, can be implemented in an order other than those illustrated in the drawings or described herein. In addition, the terms "include", "comprise" and "have" and any variations thereof are intend to cover non-exclusive inclusion, for example, the process, the method, the system, the product or the device including a sequence of steps or units needs not to be limited to those steps or units that have been listed clearly, but may include other steps or units that have not been listed clearly or are inherent to the process, method, product or device.

Those of ordinary skill in the art can understand that all or part of the steps to implement respective method embodiments mentioned above may be completed through a program instructing relevant hardware. The previously mentioned program may be stored in a computer-readable storage medium. When the program is executed, the steps of the method embodiments are executed; and the previously mentioned storage medium includes various media that can store program code, such as a ROM, a RAM, a magnetic disk or and optical disk.

Finally, it should be noted that, the above embodiments are only used to illustrate the technical solutions of the present application, but not to limit it; although the present application is described in detail with reference to the previously mentioned respective embodiments, those of ordinary skill in the art should understand: the technical solutions described in the previously mentioned embodiments may still be modified, or part or all of the technical features therein may be equivalently substituted; and such modifications and substitutions do not make the essence of the corresponding technical solutions deviate from the scope of the technical solutions of the respective embodiments of the present application.

What is claimed is:

1. A color three-dimensional (3D) printing method, comprising:
acquiring an original three-dimensional model of an object to be printed;
performing shell processing to the original three-dimensional model to generate an inner model and an outer model of the original three-dimensional model;
performing slicing processing to the inner model and the outer model to generate multiple printing data corresponding one-to-one with each printing layer, the printing data comprising structural data representing the inner model in the printing layer, actual color data representing the outer model in the printing layer, and structural data representing the outer model in the printing layer; and
printing the object to be printed using a printing material according to the printing data;
wherein the structural data representing the inner model in the printing layer is represented in a form of first image information, the actual color data representing the outer model in the printing layer is represented in a form of second image information and the structural data representing the outer model in the printing layer is represented in a form of third image information;
wherein the first image information is configured for deciding whether to respond to a printing job when the inner model is being printed, and then determining whether to print the inner model, the third image information is configured for deciding whether to respond to the printing job when the outer model is being printed, and then determining whether to print the outer model, and an actual color of a printing material of the outer model having the actual color is determined by the second image information;
wherein before the performing slicing processing to the inner model and the outer model to generate multiple printing data corresponding one-to-one with each printing layer, the method further comprises:
acquiring an empty region under a suspended part in the original three-dimensional model, and establishing, in the empty region under the suspended part, a supporting structure configured to fill the empty region under the suspended part;
the performing slicing processing to the inner model and the outer model to generate multiple printing data corresponding one-to-one with each printing layer further comprises:
performing slicing processing to the supporting structure to generate fourth image information;
wherein before the printing the object to be printed using the printing material according to the printing data, the method further comprises:
performing integration processing to the first image information, the third image information and the fourth image information to generate fifth image information, wherein the fifth image information is a 4-value image comprising four data structures, and the four data structures are given different representations;
the printing the object to be printed using the printing material according to the printing data comprises:
determining a structure in the printing layer according to the second image information and the fifth image information, and determining the actual color of the outer model in the printing layer according to the second image information; and printing the structure in the printing layer by using the printing material, the printing material comprising a printing material having the actual color of the outer model in the printing layer.

2. The color 3D printing method according to claim 1, wherein the performing slicing processing to the inner model and the outer model to generate multiple printing data corresponding one-to-one with each printing layer comprises:

performing slicing processing to the inner model to generate the first image information; and performing slicing processing to the outer model to generate the second image information and the third image information.

3. The color 3D printing method according to claim 2, wherein the printing the object to be printed using the printing material according to the printing data comprises:

determining a structure of the inner model in the printing layer according to the first image information, and determining a structure of the outer model in the printing layer by using the third image information; and printing structures in the printing layer by using the printing material.

4. The color 3D printing method according to claim 1, wherein both of the first image information and the third image information are binary image information.

5. The color 3D printing method according to claim 1, wherein the second image information is 8-bit image information, 16-bit image information, 24-bit image information or 32-bit image information.

6. The color 3D printing method according to claim 1, wherein the printing the object to be printed using the printing material according to the printing data comprises:

determining a structure of the inner model in the printing layer according to the first image information, determining a structure of the outer model in the printing layer according to the third image information, and determining a structure of the supporting structure in the printing layer according to the fourth image information; and printing structures in the printing layer by using the printing material.

7. The color 3D printing method according to claim 1, wherein the printing data includes multiple data units, the data unit comprises the structural data representing the inner model in the printing layer, the actual color data representing the outer model in the printing layer and the structural data representing the outer model in the printing layer.

8. The color 3D printing method according to claim 7, wherein the structural data representing the inner model in the printing layer, the actual color data representing the outer model in the printing layer and the structural data representing the outer model in the printing layer are data from different storage areas, respectively.

9. The color 3D printing method according to claim 8, wherein the structural data representing the inner model in the printing layer, and the actual color data representing the outer model in the printing layer and the structural data representing the outer model in the printing layer are stored in a first storage area, a second storage area and a third storage area, respectively, and the first storage area, the second storage area and the third storage area are arranged in a specified order; or, the structural data representing the inner model in the printing layer, and the actual color data representing the outer model in the printing layer and the structural data representing the outer model in the printing layer are stored in a first storage area, a second storage area and a third storage area, respectively, and the first storage area, the second storage area and the third storage area are independent of each other.

10. The color 3D printing method according to claim 7, wherein the structural data representing the inner model in the printing layer, and the actual color data representing the outer model in the printing layer and the structural data representing the outer model in the printing layer are stored in a same storage area in an order of relative position in a coordinate system.

11. The color 3D printing method according to claim 9, wherein the printing the object to be printed using the printing material according to the printing data comprises:

acquiring the printing data in the first storage area, the second storage area and the third storage area according to a preset storage order, and printing the object to be printed using the printing material according to the acquired printing data from different storage areas.

12. The color 3D printing method according to claim 10, wherein the printing the object to be printed using the printing material according to the printing data comprises:

acquiring the printing data in each data unit respectively according a preset storage order in the same storage area, and printing the object to be printed using the printing material according to the printing data in different data units.

13. The color 3D printing method according to claim 7, wherein the performing slicing processing to the inner model and the outer model to generate multiple printing data corresponding one-to-one with each printing layer comprises:

performing slicing processing to the inner model to generate the structural data of the inner model; and performing slicing processing to the outer model to generate the structural data and actual color data of the outer model.

14. The color 3D printing method according to claim 13, wherein the printing the object to be printed using the printing material according to the printing data comprises:

printing a structure of the inner model in the printing layer by using the printing material having a preset color and according to the structural data of the inner model;

determining the actual color of the outer model in the printing layer by using the actual color data of the outer model, and printing the structure of the outer model in the printing layer by using the printing material having the actual color and according to the structural data of the outer model.

15. The color 3D printing method according to claim 9, wherein the performing slicing processing to the inner model and the outer model to generate multiple printing data corresponding one-to-one with each printing layer further comprises:

performing slicing processing to the supporting structure to generate structural data of the supporting structure in the printing layer, wherein the structural data of the supporting structure is stored in a fourth storage area in the order of relative position in the coordinate system, or the structural data of the supporting structure, the structural data of the inner model, and the actual color data and the structural data of the outer model are stored together in a same storage area in the order of relative position in the coordinate system.

16. A color three-dimensional (3D) printing apparatus, comprising:
a memory, a processor and a computer program stored on the memory and runnable on the processor,
wherein the processor, when running the computer program, is configured to:
acquire an original three-dimensional model of an object to be printed;
perform shell processing to the original three-dimensional model to generate an inner model and an outer model of the original three-dimensional model; and
perform slicing processing to the inner model and the outer model to generate multiple printing data corresponding one-to-one with each printing layer, the printing data comprising structural data representing the inner model in a printing layer, actual color data representing the outer model in the printing layer, and structural data representing the outer model in the printing layer; and
print the object to be printed using the printing material according to the printing data;
wherein the structural data representing the inner model in the printing layer is represented in a form of first image information, the actual color data representing the outer model in the printing layer is represented in a form of second image information and the structural data representing the outer model in the printing layer is represented in a form of third image information;
wherein the first image information is configured for deciding whether to respond to a printing job when the inner model is being printed, and then determining whether to print the inner model, the third image information is configured for deciding whether to respond to the printing job when the outer model is being printed, and then determining whether to print the outer model, and the actual color of the printing material having the actual color of the outer model is determined by the second image information;
wherein before the performing slicing processing to the inner model and the outer model to generate multiple printing data corresponding one-to-one with each printing layer, the method further comprises:
acquiring an empty region under a suspended part in the original three-dimensional model, and establishing, in the empty region under the suspended part, a supporting structure configured to fill the empty region under the suspended part;
the performing slicing processing to the inner model and the outer model to generate multiple printing data corresponding one-to-one with each printing layer further comprises:
performing slicing processing to the supporting structure to generate fourth image information;
wherein before the printing the object to be printed using the printing material according to the printing data, the method further comprises:
performing integration processing to the first image information, the third image information and the fourth image information to generate fifth image information, wherein the fifth image information is a 4-value image comprising four data structures, and the four data structures are given different representations;
the printing the object to be printed using the printing material according to the printing data comprises:
determining a structure in the printing layer according to the second image information and the fifth image information, and determining the actual color of the outer model in the printing layer according to the second image information; and
printing the structure in the printing layer by using the printing material having the actual color, the printing material comprising a printing material having the actual color of the outer model in the printing layer.

* * * * *